(12) United States Patent
Xu et al.

(10) Patent No.: US 10,932,271 B2
(45) Date of Patent: Feb. 23, 2021

(54) METHOD AND APPARATUS FOR GROUPING VEHICLES IN INTERNET OF VEHICLES

(71) Applicant: ZTE CORPORATION, Guangdong (CN)

(72) Inventors: Hui Xu, Guangdong (CN); Zijiang Ma, Guangdong (CN); Ling Xu, Guangdong (CN); Yutang Xie, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 109 days.

(21) Appl. No.: 15/736,590

(22) PCT Filed: Apr. 22, 2016

(86) PCT No.: PCT/CN2016/080069
§ 371 (c)(1),
(2) Date: Dec. 14, 2017

(87) PCT Pub. No.: WO2016/206465
PCT Pub. Date: Dec. 29, 2016

(65) Prior Publication Data
US 2018/0146471 A1     May 24, 2018

(30) Foreign Application Priority Data
Jun. 26, 2015   (CN) .......................... 201510365970.6

(51) Int. Cl.
*H04W 72/04*      (2009.01)
*H04W 4/46*       (2018.01)
(Continued)

(52) U.S. Cl.
CPC .......... *H04W 72/048* (2013.01); *H04L 67/12* (2013.01); *H04W 4/08* (2013.01); *H04W 4/44* (2018.02); *H04W 4/46* (2018.02); *H04W 4/027* (2013.01)

(58) Field of Classification Search
CPC ....... H04W 72/048; H04W 4/46; H04W 4/08; H04W 4/44; H04W 4/027; H04L 67/12
See application file for complete search history.

(56) References Cited

U.S. PATENT DOCUMENTS

| | | | |
|---|---|---|---|
| 2008/0095134 A1* | 4/2008 | Chen ................... | H04B 7/2606 370/342 |
| 2009/0285197 A1 | 11/2009 | Chen et al. | |
| 2013/0179056 A1* | 7/2013 | Fukuyama .......... | G08G 1/0112 701/117 |

FOREIGN PATENT DOCUMENTS

| | | |
|---|---|---|
| CN | 104048672 A | 9/2014 |
| CN | 104717071 A | 6/2015 |
| WO | 2010098554 A2 | 9/2010 |

OTHER PUBLICATIONS

Bellavista P. et al., "V2X Protocols for Low-Penetration-Rate and Cooperative Traffic Estimations", 2014 IEEE 80th Vehicular Technology Conference (VTC2014—Fall), pp. 1-6 (Sep. 14, 2014).

(Continued)

*Primary Examiner* — Jackie Zuniga Abad
(74) *Attorney, Agent, or Firm* — Morgan, Lewis & Bockius LLP

(57) ABSTRACT

Disclosed are a method and apparatus for grouping vehicles in Internet of Vehicles. The method comprises: a designated vehicle within a coverage area of a road-side unit (RSU) satisfying a preset condition receives first indication information of the RSU, the first indication information being set for indicating the designated vehicle to be a vehicle having a management permission to manage a vehicle group to (Continued)

which the designated vehicle pertains; or designated vehicles outside the coverage area of the RSU satisfying a preset condition negotiate to decide a final designated vehicle; the designated vehicle periodically broadcasts a first message set for performing vehicle grouping to the vehicles within the coverage of the RSU and/or outside the coverage of the RSU; the designated vehicle receives a second message in response to the first message; and the designated vehicle groups vehicles that send the second message to a vehicle group.

17 Claims, 9 Drawing Sheets

(51) Int. Cl.
    *H04W 4/08*     (2009.01)
    *H04W 4/44*     (2018.01)
    *H04L 29/08*     (2006.01)
    *H04W 4/02*     (2018.01)

(56) References Cited

OTHER PUBLICATIONS

"3rd Generation Partnership Project; Technical Specification Group Services and System Aspects; Study on LTE Support for V2X Services (Release 14)", 3GPP Draft, 33 pages (Apr. 23, 2015).
LG Electronics Inc., "Proposed Text for Overview Section for V2X TR", 3rd Generation Partnership Project (3GPP), Mobile Competence Centre, 3 pages (Feb. 2, 2015).
Extended European Supplementary Search Report dated Mar. 23, 2018 received in European Patent Application No. 16 81 3581.2.
International Search Report dated Jul. 20, 2016 issued in PCT/CN2016/080069.
China Patent Office, Office action dated Apr. 30, 2020 regarding the China patent application No. CN201510365970.6.
Paolo Bellavista, et al., "V2X Protocols for Low-Penetration-Rate and Cooperative Traffic Estimations", Sep. 14, 2014, pp. 2-3, 2014, IEEE 80th Vehicular Technology Conference (VTC2014—Fall).

* cited by examiner

METHOD AND APPARATUS FOR GROUPING VEHICLES IN INTERNET OF VEHICLES

CROSS-REFERENCE TO RELATED APPLICATION

This application is based upon and claims priority to PCT Application No. PCT/CN2016/080069, filed Apr. 22, 2016, which is based upon and claims priority to Chinese Patent Application No. 201510365970.6, filed Jun. 26, 2015, the entire contents of which are incorporated herein by reference.

TECHNICAL FIELD

The present disclosure relates to, but not limited to, the field of communication, and more particularly, to a method and a device for grouping vehicles in Vehicle to Everything.

BACKGROUND

With rapid development of economy and society, China has seen rapid increase in car ownership, and also more frequent road traffic accidents. This has become one of the important factors that affect the sense of public security in our country in recent years. The problem of road traffic safety has become one of the basic problems affecting social harmony and improving people's livelihood. China urgently needs improvements in traffic safety from the aspects of technology, policy and education. Among them, the promotion of vehicle safety design is an important part of it.

The technology to enhance vehicle safety is mainly divided into passive safety technology and active safety technology. Passive safety technology is designed to protect the personnel and items inside and outside of the vehicle after the accident. The active safety technology is designed to prevent and reduce vehicle accidents and avoid personal injury. The active safety technology is the focus and trend of the development of modern vehicle safety technology.

A conflict early warning system based on communication realizes real-time information interaction between vehicles, vehicles and roadside infrastructures by utilizing advanced wireless communication technology and new-generation information processing technology. It may allow the vehicles, vehicles and roadside infrastructures to notify each other of the current status (including the position, speed acceleration, and driving route of vehicles) and the known information of the road environment, detect the dangerous situation of the road in collaboration, and provide various kinds of conflict early warning information in time, so as to prevent the occurrence of road traffic safety accidents. It has become a new idea of trying to solve the road traffic safety problems in various countries at present.

FIG. 1 is a schematic diagram illustrating sending traffic and scheduling information to a vehicle through a network information platform in the related art. FIG. 2 is a schematic diagram illustrating architecture of Vehicle to Everything in the related art. Referring FIGS. 1 and 2, Vehicle to Everything (V2X) refers to providing vehicle information through a sensor mounted on a vehicle, a terminal on board of a vehicle and an electronic tag, and by means of various communication technology, to realize communication between vehicle to vehicle (V2V), vehicle to pedestrian (V2P), vehicle to road or infrastructure (V2I), and realize effective utilization of the information on an information network platform by accessing and sharing or the like, to facilitate effective management and comprehensive service for the vehicles.

In recent years, with the development of new mobile communication technology, LTE technology has been proposed in the world to address the research on V2X based communication application. A Road Side Unit (RSU) may receive a request from a vehicle, to ensure that the vehicle is connected to the Internet and has the function of a gateway. In addition, the RSU also has data computing, storage and forwarding functions.

A Vehicle to Road Side Unit (V2R, also known as V2I) communication may have the following key features.

(1) When the RSU broadcasts, the broadcast information is sent only to all vehicles within its coverage.

(2) One-hop transmission is between the RSU and the vehicle, to prevent the adverse impact of the low success rate of packet delivery caused by multi-hop, and the low network throughput or the like.

(3) The RSU may quickly receive and detect the passing vehicles, traffic lights and some traffic information, and process, re-sort and select the information and then send the information to the vehicle.

The above three aspects ensure that when the vehicle passes through the RSU, by establishing a connection with the RSU, the vehicle may be reliably connected to the Internet in real time or download data stored in the RSU.

In order to realize V2V communication, each vehicle supporting V2V communication needs resources required for communication (such as physical resources such as frequency and timeslots for communication). When V2V communication adopts a device to device (D2D) technology defined by the 3rd Generation Partnership Project (3GPP), the resources required for V2V communication may be obtained in a competitive manner, for example, first-come first-served. However, this method may cause congestion and conflict in resources in a region with more vehicles. For example, a resource block has been allocated in advance, and multiple vehicles tend to use the same resource (e.g., the same frequency resource and timeslot resource). This may cause neither of these vehicles can use the resource, and neither of these vehicles can send information out. Therefore, in the V2V communication, if the vehicles obtain the resources in the resource pool in a competitive manner, it tends to generate conflict and cause the vehicle information cannot be sent out in time.

It may be seen from the above that in the related art, in a region densely-populated with cars, when a network allocates resources for multiple vehicles, with changes in cells due to the rapid movement of the vehicle grouping, the device at the network side fails to allocate and release resources for the vehicles in time. For the above problem in the related art, there is no effective solution yet at present.

This section provides background information related to the present disclosure which is not necessarily prior art.

SUMMARY

The following is an overview of the topics described in detail in this article. This summary is not intended to limit the scope of the claims.

Embodiments of the present disclosure provide a method and a device for grouping vehicles in Vehicle to Everything.

According to one aspect of the present disclosure, there is provided a method for grouping vehicles in Vehicle to Everything, including: receiving, by a designated vehicle that satisfies a preset condition within a coverage region of a Road Side Unit RSU, a first indication data from the RSU, the first indication data being for indicating that the designated vehicle becomes a vehicle having management authority for managing a vehicle group to which the designated vehicle belongs, or negotiating, by designated vehicles that satisfy the preset condition outside the coverage region of the RSU, to generate a final designated vehicle; periodically broadcasting, by the designated vehicle, a first message to vehicles within the coverage of the RSU and/or outside the coverage of the RSU, the first message being for indicating grouping the vehicle; receiving, by the designated vehicle, a second message in response to the first message, the second message being for indicating joining the vehicle group; and grouping, by the designated vehicle, the vehicle which sends the second message to the vehicle group.

In an implementation, receiving, by the designated vehicle, a second message in response to the first message includes: sending, by the designated vehicle, a request message to the vehicle responding to the first message, the request message being for requesting the vehicle to join the vehicle group; and receiving, by the designated vehicle, the second message in response to the request message; or receiving, by the designated vehicle, the second message from the vehicle that receives the first message.

After the step of receiving, by a designated vehicle that satisfies a preset condition within a coverage region of a Road Side Unit RSU, a first indication data from the RSU, the method further includes: when there are multiple vehicles having management authority, receiving, by the designated vehicle, a second indication data sent from the RSU, the second indication data being for indicating that the designated vehicle is the final vehicle having the management authority; or, taking the designated vehicle as the final vehicle having the management authority according to a preset rule.

After the step of grouping, by the designated vehicle, the vehicle which sends the second message to the vehicle group, the method further includes: when a vehicle in the vehicle group intends to quit the vehicle group, receiving, by the designated vehicle, a notification message for informing quitting the vehicle group; and releasing, by the designated vehicle, the management authority to the vehicle which intends to quit the vehicle group.

In an implementation, the preset condition includes at least one of: a calculation capability, an electricity quantity, a storage space, a location, a traveling direction and a service ability.

In an implementation, the first message carries at least one of: a wireless resource pool, a location of a vehicle group, a traveling direction, a speed, and a Vehicle to Everything service.

In an implementation, the designated vehicles that satisfy the preset condition negotiate based on one or more of the following conditions: vehicle identification numbers, vehicle calculation capabilities, vehicle storage spaces, vehicle locations, and a predefined rule.

According to another aspect of the present disclosure, there is provided a device for grouping vehicles in Vehicle to Everything, disposed at a side of a designated vehicle that satisfies a preset condition in Vehicle to Everything, and the device including: a first receiving module configured to receive within a coverage region of a Road Side Unit RSU, a first indication data from the RSU, the first indication data being for indicating that the designated vehicle becomes a vehicle having management authority for managing a vehicle group to which the designated vehicle belongs, or a negotiating module configured to negotiate outside the coverage region of the RSU to generate a final designated vehicle; a broadcasting module configured to periodically broadcast a first message to vehicles within the coverage of the RSU and/or outside the coverage of the RSU, the first message being for indicating grouping the vehicle; a second receiving module configured to receive a second message in response to the first message, the second message being for indicating joining the vehicle group; and a sending module configured to group the vehicle which sends the second message to the vehicle group.

In an implementation, the second receiving module includes: a sending unit configured to send a request message to the vehicle responding to the first message, the request message being for requesting the vehicle to join the vehicle group; and a first receiving unit configured to receive the second message in response to the request message; or a second receiving unit configured to receive the second message from the vehicle that receives the first message.

In an implementation, the device further includes: a management module configured to, when there are multiple vehicles having management authority, receive a second indication data sent from the RSU, the second indication data being for indicating that the designated vehicle is the final vehicle having the management authority; or, take the designated vehicle as the final vehicle having the management authority according to a preset rule.

In an implementation, the device further includes: a third receiving module configured to, when a vehicle in the vehicle group intends to quit the vehicle group, receive a notification message for informing quitting the vehicle group; and a releasing module configured to release the management authority to the vehicle which intends to quit the vehicle group.

In the embodiments of the present disclosure, the RSU sends a first indication data to a designated vehicle that satisfies a preset condition in the coverage of the RSU. The first indication data is for indicating that the designated vehicle has management authority for managing a vehicle group to which the designated vehicle belongs. The designated vehicle periodically broadcasts a first message to vehicles within the coverage of the RSU and/or outside the coverage of the RSU, the first message being for indicating grouping the vehicle. The designated vehicle groups the vehicle which responds to the first message and intends to join the vehicle group into one group. In this way, the vehicles in Vehicle to Everything may be managed in groups. It may solve the problem that in a region densely-populated with cars, when a network allocates resources for multiple vehicles, with changes in cells due to the rapid movement of the vehicle grouping, the device at the network side fails to allocate and release resources for the vehicles in time.

According to another aspect of the present disclosure, there is provided a device for grouping vehicles in Vehicle to Everything, disposed at a side of a designated vehicle that satisfies a preset condition in Vehicle to Everything. The device includes a processor and a memory. The memory stores instructions executable by the processor. The processor is configured to perform: receiving, within a coverage region of a Road Side Unit RSU, a first indication data from the RSU, the first indication data being for indicating that the designated vehicle becomes a vehicle having management authority for managing a vehicle group to which the designated vehicle belongs, or negotiating, outside the coverage region of the RSU, to generate a final designated vehicle; periodically broadcasting a first message to vehicles within the coverage of the RSU and/or outside the coverage of the RSU, the first message being for indicating grouping the vehicle; receiving a second message in response to the first message, the second message being for indicating joining the vehicle group; and grouping the vehicle which sends the second message to the vehicle group.

According to another aspect of the present disclosure, there is provided a computer-readable storage medium storing computer-executable instructions that, when being executed by a processor, implement the method of the first aspect.

Other aspects will become apparent upon reading and understanding the drawings and detailed description.

This section provides a summary of various implementations or examples of the technology described in the disclosure, and is not a comprehensive disclosure of the full scope or all features of the disclosed technology.

DETAILED DESCRIPTION

Hereinafter, the embodiments of the present disclosure will be described in detail with reference to the accompanying drawings and the embodiments. It should be noted that, the embodiments in the present application and the features in the embodiments may be combined with each other without conflict.

It should be noted that the terms "first", "second" and the like in the description of the embodiments of the present disclosure, the claims and the foregoing drawings are for distinguishing similar objects, and not for describing a specific sequence or a successively order.

Figure 1:
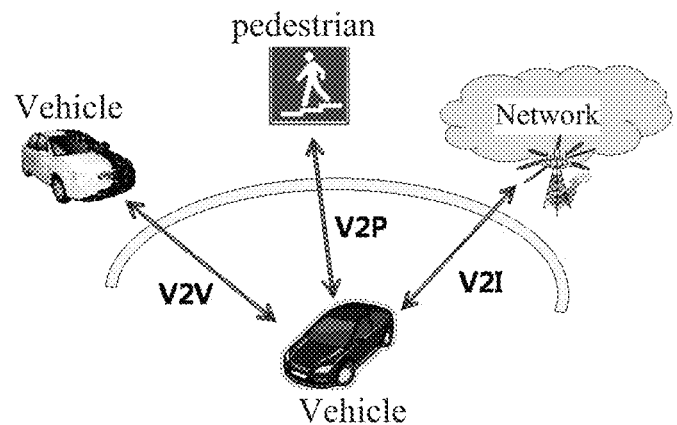
FIG. 1 is a schematic diagram illustrating sending traffic and scheduling information to a vehicle through a network information platform in the related art.
Figure 2:
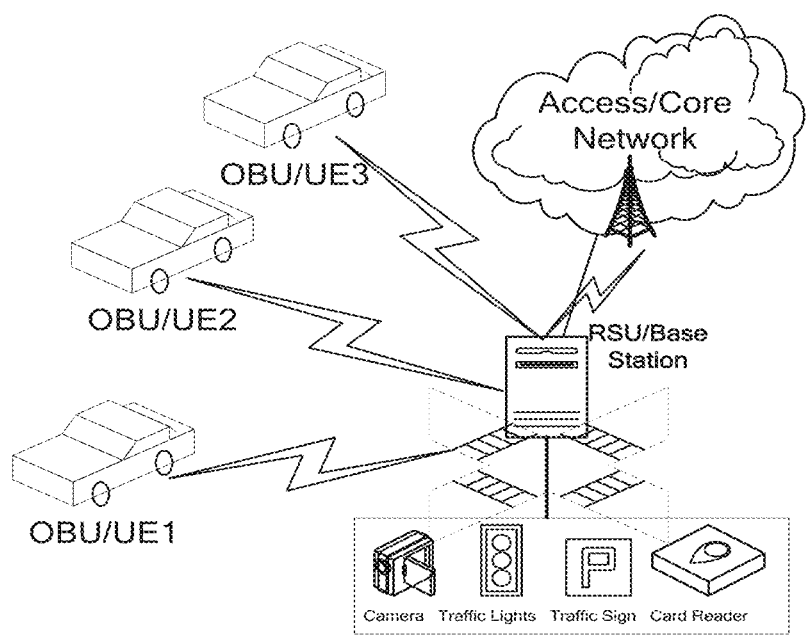
FIG. 2 is a schematic diagram illustrating architecture of Vehicle to Everything in the related art.
Figure 3:
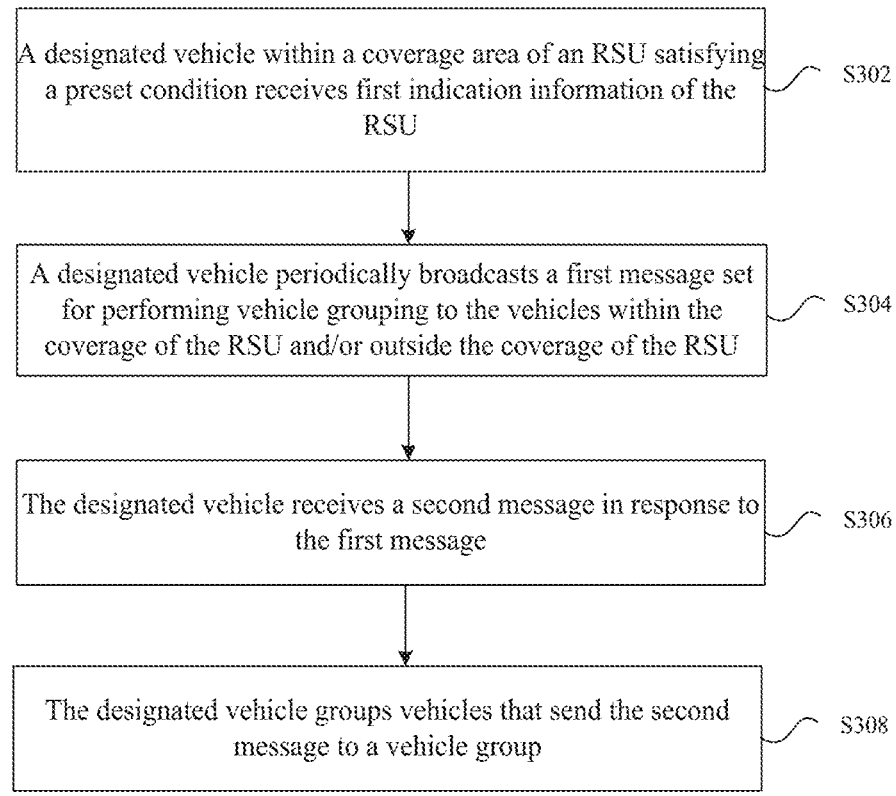
FIG. 3 is a flowchart illustrating a method for grouping vehicles in Vehicle to Everything according to an embodiment of the present disclosure.

In an embodiment, there is provided a method for grouping vehicles in Vehicle to Everything. FIG. 3 is a flowchart illustrating a method for grouping vehicles in Vehicle to Everything according to an embodiment of the present disclosure. As shown in FIG. 3, the method includes the following steps.

In step S302, a designated vehicle that satisfies a preset condition receives a first indication data from the RSU within a coverage region of a RSU. The first indication data is for indicating that the designated vehicle becomes a vehicle having management authority for managing a vehicle group to which the designated vehicle belongs. Alternatively, designated vehicles that meet the preset condition outside the coverage region of the RSU negotiate to generate a final designated vehicle.

In step S304, the designated vehicle periodically broadcasts a first message to vehicles in the coverage of the RSU and/or outside the coverage of the RSU, the first message being for indicating grouping the vehicle.

In step S306, the designated vehicle receives a second message in response to the first message, the second message being for indicating joining the vehicle group.

In step S308, the designated vehicle groups the vehicle which sends the second message to the vehicle group.

In the embodiment, through the steps S302-S308, the RSU sends a first indication data to a designated vehicle that satisfies a preset condition in the coverage of the RSU. The first indication data is for indicating that the designated vehicle becomes a vehicle having management authority for managing a vehicle group to which the designated vehicle belongs. The designated vehicle periodically broadcasts a first message to vehicles in the coverage of the RSU and/or outside the coverage of the RSU, the first message being for indicating grouping the vehicle. The designated vehicle groups the vehicle which responds to the first message and intends to join the vehicle group into one group. In this way, the vehicles in Vehicle to Everything may be managed in groups. It may solve the problem that in a region densely-populated with cars, when a network allocates resources for multiple vehicles, with changes in cells due to the rapid movement of the vehicle grouping, the device at the network side fails to allocate and release resources for the vehicles in time.

In the embodiment, the designated vehicle receiving a second message in response to the first message involved in step S306 may be performed through any of the following manners.

In a first manner, the designated vehicle sends a request message to the vehicle responding to the first message. The request message is for requesting the vehicle to join the vehicle group. Then, the designated vehicle receives a second message in response to the request message.

In a second manner, the designated vehicle receives the second message from the vehicle that receives the first message.

It may be seen from the above first and second manners that a vehicle may join a vehicle group by two manners. First, the vehicle sends a message for joining the vehicle group to the designated vehicle upon receiving the group sent by the designated vehicle. Alternatively, the designated vehicle acquires which vehicle receives the first message, and then sends a request message inviting the vehicle to join the vehicle group to the vehicle which receives the first message.

In the embodiment, after the designated vehicle that satisfies a preset condition in the coverage of the RSU receives the first indication data from the RSU, the method of the embodiment also includes: when there are multiple vehicles having management authority, the designated vehicle receives a second indication data sent from the RSU. The second indication data is for indicating that the designated vehicle is the final vehicle having the management authority. Alternatively, the designated vehicle may be taken as the final vehicle having the management authority according to a preset rule.

That is, when there are multiple vehicles that meet the preset condition in the RSU coverage and may become the vehicle having the management authority, in order to avoid conflict, when there are multiple vehicles having the management authority, the RSU may indicate to determine the final vehicle having the management authority. Alternatively, the multiple vehicles having the management authority may determine the final vehicle having the management authority according to a preset rule. The preset rule may be comparing among the vehicles having the management authority in terms of any one or more of: calculation capability, electricity quantity, storage space, location, traveling direction and service ability or the like.

In the embodiment, after the designated vehicle groups the vehicle which sends the second message to the vehicle group, the method of the embodiment may also include the following steps.

In step S11, when a vehicle in the vehicle group intends to quit the vehicle group, the designated vehicle receives a notification message for informing quitting the vehicle group.

In step S12, the designated vehicle releases the management authority to the vehicle which intends to quit the vehicle group.

In addition, the preset condition in the embodiment may include at least one of: calculation capability, electricity quantity, storage space, location, traveling direction and service ability. However, the above preset conditions are merely optional preset conditions in the embodiment, which does not constitute limitation to the embodiment of the present disclosure, and the corresponding preset condition may be increased or decreased according to a specific application scenario.

In the embodiment, the first message broadcast by the designated vehicle includes: a wireless resource pool, a location of a vehicle group, a traveling direction, a speed, and a Vehicle to Everything service. It should be noted that, the first message is not limited to the above information, and corresponding information may be increased or decreased according to a specific application scenario.

In the embodiment, designated vehicles that meet the preset condition may negotiate based on one or more of the following conditions: vehicle identification number, vehicle calculation capability, vehicle storage space, vehicle location, and a predefined rule. In a specific application scenario, it is possible that among the designated vehicles that meet the preset condition, the vehicle with the smallest identification number may be the final designated vehicle. Alternatively, it is possible that the vehicle with the strongest vehicle calculation capability may be the final designated vehicle. Similarly, it is possible that the vehicle with the largest vehicle storage space, or the middle vehicle location may be the final designated vehicle. In addition, the final designated vehicle may also be selected according to a preset rule. The above negotiating conditions may be applied in combination or separately.

It should be noted that, in the embodiment, the vehicle involved is a vehicle containing an on-board unit (OBU). The vehicle containing an OBU has a Vehicle to Everything function.

Through the above description of the embodiment, those skilled in the art may clearly understand that the method according to the above embodiment may be implemented through software in connection with a necessary general hardware platform, or may be implemented by hardware. However, in many cases, the former is a better implementation. Based on this understanding, the technical solution of the embodiment of the present disclosure in essence or the part contributing to the prior art may be embodied in the form of a software product. The computer software product is stored in a storage medium (such as a ROM/RAM, a magnetic disc, an optical disc), including several instructions which may cause a terminal device (such as a mobile phone, a computer, a server, or a network device and the like) to execute the method according to the embodiments of the present disclosure.

In an embodiment, there is also provided a device for grouping vehicles in Vehicle to Everything. The device is configured to implement the above embodiment, and the redundant description will not be repeated. As used herein, the term "module" may be a combination of software and/or hardware that achieves a predetermined function. Although the device described in the following embodiment is preferably implemented in software, the implementation of hardware or a combination of software and hardware is also possible and contemplated.

Figure 4:
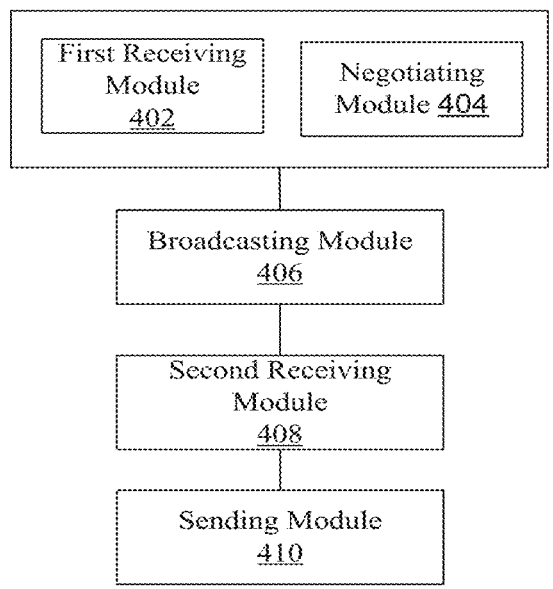
FIG. 4 is a block diagram illustrating a device for grouping vehicles in Vehicle to Everything according to an embodiment of the present disclosure.

FIG. 4 is a block diagram illustrating a device for grouping vehicles in Vehicle to Everything according to an embodiment of the present disclosure, which is disposed at the designated vehicle side that satisfies a preset condition within the coverage of the RSU. As shown in FIG. 4, the device includes: a first receiving module 402 configured to receive a first indication data from the RSU within a coverage region of the RSU. The first indication data is for indicating that the designated vehicle becomes a vehicle having management authority for managing a vehicle group to which the designated vehicle belongs; or a negotiating module 404 configured to negotiate to generate a final designated vehicle outside the coverage region of the RSU; a broadcasting module 406 coupled to the first receiving module 402 or the negotiating module 404 and configured to periodically broadcast a first message to vehicles in the coverage of the RSU and/or outside the coverage of the RSU, the first message being for indicating grouping the vehicle; a second receiving module 408 coupled to the broadcasting module 406 and configured to receive a second message in response to the first message, the second message being for indicating joining the vehicle group; a sending module 410 coupled to the second receiving module 408 and configured to group the vehicle which sends the second message to the vehicle group.

Figure 5:
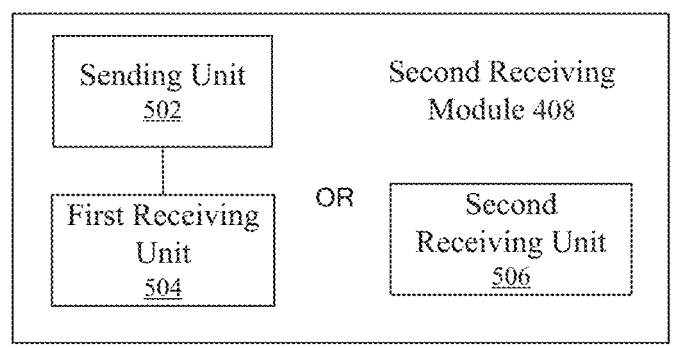
FIG. 5 is a first alternative block diagram illustrating a device for grouping vehicles in Vehicle to Everything according to an embodiment of the present disclosure.

FIG. 5 is a first alternative block diagram illustrating a device for grouping vehicles in Vehicle to Everything according to an embodiment of the present disclosure. As shown in FIG. 5, the second receiving module 408 includes: a sending unit 502 configured to send a request message to the vehicle responding to the first message, the request message being for requesting the vehicle to join the vehicle group; a first receiving unit 504 coupled to the sending unit 502 and configured to receive a second message in response to the request message; or, a second receiving unit 506 configured to receive the second message from the vehicle that receives the first message.

Figure 6:
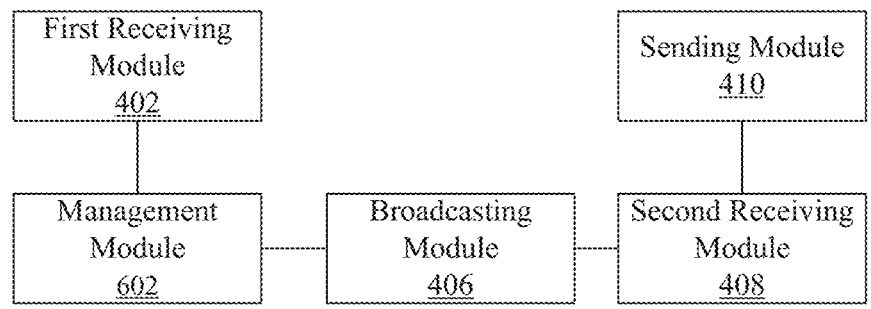
FIG. 6 is a second alternative block diagram illustrating a device for grouping vehicles in Vehicle to Everything according to an embodiment of the present disclosure.

FIG. 6 is a second alternative block diagram illustrating a device for grouping vehicles in Vehicle to Everything according to an embodiment of the present disclosure. As shown in FIG. 6, after the designated vehicle that satisfies a preset condition in the coverage of the RSU receives the first indication data from the RSU, the device also includes: a management module 602 coupled to the first receiving module 402 and configured to, when there are multiple vehicles having management authority, receive a second indication data sent from the RSU. The second indication data is for indicating that the designated vehicle is the final vehicle having the management authority. Alternatively, the designated vehicle may be taken as the final vehicle having the management authority according to a preset rule.

Figure 7:
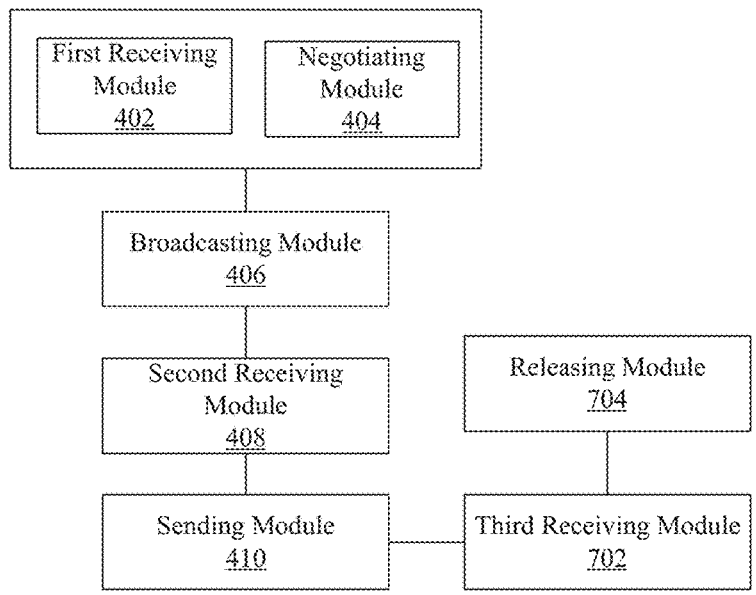
FIG. 7 is a third alternative block diagram illustrating a device for grouping vehicles in Vehicle to Everything according to an embodiment of the present disclosure.

FIG. 7 is a third alternative block diagram illustrating a device for grouping vehicles in Vehicle to Everything according to an embodiment of the present disclosure. As shown in FIG. 7, after the designated vehicle groups the vehicle which sends the second message to the vehicle group, the device also includes: a third receiving module 702 coupled to the sending module 410 and configured to, when a vehicle in the vehicle group intends to quit the vehicle group, receive a notification message for informing quitting the vehicle group; and a releasing module 704 coupled to the third receiving module 702 and configured to release the management authority to the vehicle which intends to quit the vehicle group.

Hereinafter, the embodiments of the present disclosure will be fully illustrated with reference to specific embodiments.

In an embodiment, there is provided a method for grouping a vehicle team. The method includes the following steps. Within a coverage region of the RSU, the RSU determines a lead vehicle (corresponding to a designated vehicle in the above embodiment). Outside the coverage region of the RSU, the lead vehicle is determined through negotiation. The lead vehicle requests OBUs on other vehicles to join the vehicle team, or the OBUs on other vehicles to actively join the vehicle team (corresponding to the vehicle grouping in the above embodiment). The lead vehicle is responsible for updating members of the vehicle team. Through the method in the embodiment, it may realize dynamically establishing a vehicle team inside or outside the coverage of the RSU, improving the configuration efficiency of the V2X vehicle team.

The vehicle team involved in the embodiment refers to a vehicle team formed by OBUs according to a certain rule in V2X communication. Each vehicle team has a lead vehicle. The certain rule may be previously set by an operator/a service provider. The rule for grouping a vehicle team includes rules defined according to a vehicle location, an OBU type and a V2X service, or the like. The purpose of the vehicle team is to facilitate management of the OBUs in the vehicle team, such as V2V/V2P wireless idle interface resource allocation. Each vehicle team has a unique identification, such a group ID.

The lead vehicle may be generated through designation by the RSU (inside the coverage), or through negotiation (outside the coverage). The lead vehicle has the following functions, including: allocating V2V/V2P communication wireless resources to members of the vehicle team, communicating with the RSU, broadcasting vehicle team information, communicating with other vehicle team, etc. The lead vehicle of the vehicle team may be updated as desired. The update of the lead vehicle is notified to all the members of the vehicle team. The lead vehicle periodically sends a broadcast message. The content of the broadcast message at least includes: an identification of the vehicle team and an identification of the lead vehicle. Further contents may also include: a resource pool, identifications of members of the vehicle team, a service for the vehicle team, a speed of the vehicle team, a traveling direction of the vehicle team, an identification of a candidate lead vehicle of the vehicle team, etc.

It should be noted that the members of the vehicle team may perform communication V2I with the RSU (within the coverage of the RSU), in addition to performing communication V2V with each other, performing communication V2P with a pedestrian, and performing communication V2V with the lead vehicle. The lead vehicle allocates the wireless communications resources for the members of the vehicle team performing communication with each other, with a pedestrian, and with the lead vehicle. The RSU allocates the wireless communications resources for the members of the vehicle team performing communication with the RSU.

The function of the lead vehicle is similar to the RSU. A vehicle team is equivalent to a mobile cell. When a member of the vehicle team needs to perform V2V/V2P communication, the member may request a wireless resource to the lead vehicle of the vehicle team, or select a resource in a resource pool designated by the lead vehicle.

The RSU is a base station eNB or a stationary UE or a dedicated RSU (for example, an access point AP in 802.11P). Within the coverage region of the RSU means that all the members of the vehicle team are located in the coverage region of the RSU, and may be determined by the RSU according to the locations of the members of the vehicle team. The size of the vehicle team is dynamic. For example, the vehicle team may have only the lead vehicle initially. The number of the members of the vehicle team may dynamically change.

Figure 8:
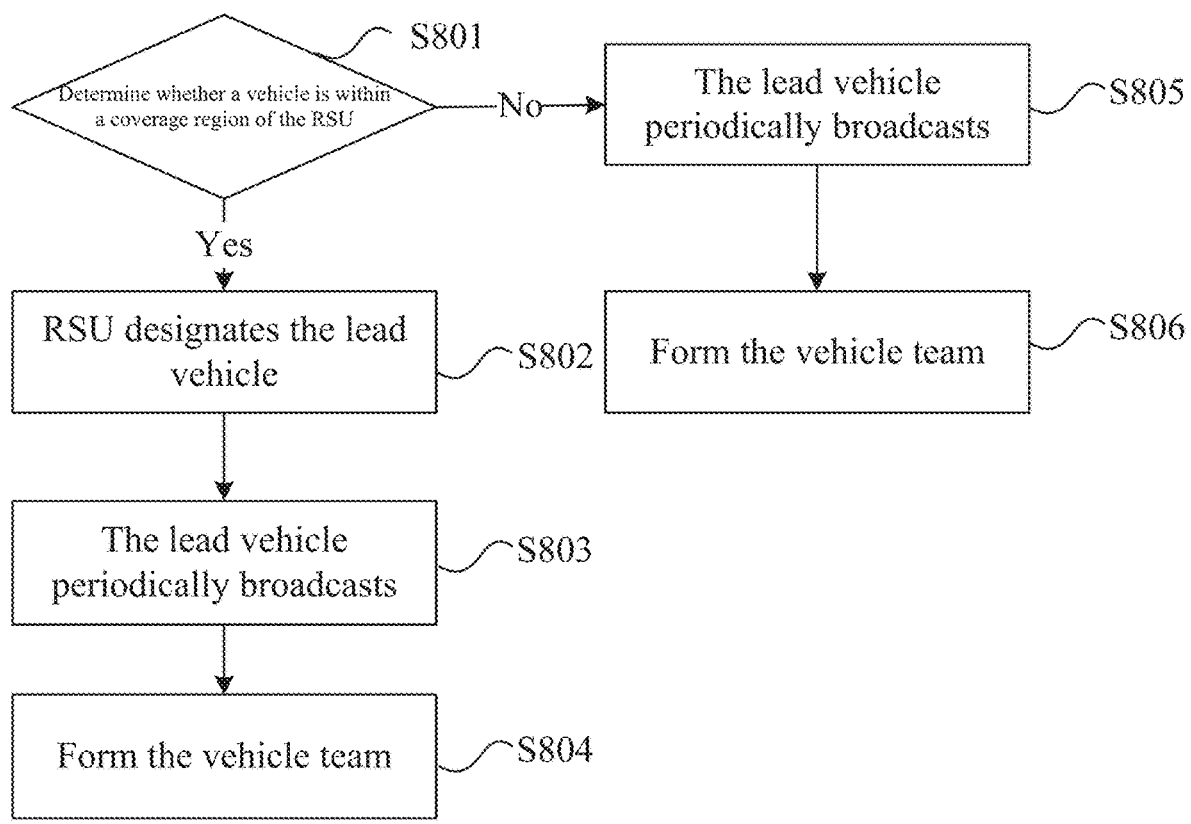
FIG. 8 is a flowchart illustrating a method for grouping a vehicle team according to an alternative embodiment of the present disclosure.

Hereinafter, the method for grouping a vehicle team according to the embodiment will be described in detail. FIG. 8 is a flowchart illustrating a method for grouping a vehicle team according to an alternative embodiment of the present disclosure. As shown in FIG. 8, the method includes the following steps.

In step S801, it is determined whether a vehicle is within a coverage region of the RSU. If the vehicle is within the coverage region of the RSU, the method proceeds to step S802; and if the vehicle is not within the coverage region of the RSU, the method proceeds to step S805.

In step S802, the RSU designates the lead vehicle.

The RSU may designate the lead vehicle according to features of an OBU of a vehicle or a condition for a lead vehicle. The features of an OBU may include one or more of: calculation capability, electricity quantity, storage space, location, traveling direction and service ability, etc. The condition for a lead vehicle refers to the requirement for being a lead vehicle, such as one or more of: calculation capability, electricity quantity, storage space, location and service ability, etc. The OBU that satisfies the condition for a lead vehicle generally carries a capability identification. For example, a bit C for lead vehicle capability may be stored on a SIM/USIM card, C=1 means satisfying the condition for a lead vehicle, and C=0 means not satisfying the condition. The OBU that satisfies the condition sends a capability indication data to the RSU, and indicates that the OBU may be a candidate for the lead vehicle. The RSU sends a request to the OBU that satisfies the condition, and inquiries whether the OBU intends to become a lead vehicle. The RSU determines the lead vehicle according to the response message from the OBU that satisfies the condition. Alternatively, the OBU that satisfies the condition sends a request message to the RSU to request for being a lead vehicle. The RSU sends a response message after determination: to approve or deny the request.

The RSU sends a notification message to the designated lead vehicle. The notification message at least includes: an identification of the vehicle team. Further, the notification message may also include: a wireless resource pool of a vehicle team, and members of a vehicle team.

In step S803, lead vehicle information is periodically broadcast.

The periodical broadcast is sent by the RSU or the lead vehicle. The content of the broadcast at least includes: an identification of the vehicle team and an identification of the lead vehicle. In addition, the content of the broadcast may also include: a wireless resource pool, a location of the vehicle team, a traveling direction, a speed, a service, a calculation capability of the lead vehicle, etc.

In step S804, the vehicle team is formed.

The vehicle team may be formed through two manners: 1) The lead vehicle detects OBUs of adjacent vehicles, and the lead vehicle sends a request message to the adjacent OBUs to invite the OBUs to join the vehicle team; the OBU receiving the request sends a response message to accept or deny the request; or 2) OBUs of adjacent vehicles detect the lead vehicle and send request messages to the lead vehicle to request for joining the lead vehicle; the lead vehicle receiving the requests sends a response message to the OBUs to accept or deny the requests.

It should be noted that within the coverage region of the RSU, lead vehicle conflicts may be generally avoided (such as two lead vehicles coexists in adjacent regions). If there is a conflict, there are two kinds of solutions: 1) requesting the RSU for arbitration; 2) the two lead vehicles negotiating.

If during the travelling process of the vehicle team, there is a member intending to quit. If the lead vehicle quits or the lead vehicle does not hold the post of the lead vehicle, the RSU selects a new lead vehicle or makes the candidate lead vehicle of the vehicle team as a new lead vehicle. If other member quits, the member notifies the lead vehicle before quitting. If the member fails to notify the lead vehicle, the member notifies the RSU or other member of the vehicle team, and the RSU or other member may in turn notify the lead vehicle.

In step S805, the lead vehicle periodically broadcasts.

Outside the coverage region of the RSU, the lead vehicle periodically broadcasts according to its own capability. The period is designated and stored in the lead vehicle in advance. The broadcast includes: an identification of the vehicle team, an identification of the lead vehicle. The broadcast may also include: a resource pool, a location of the lead vehicle, a traveling direction, a speed, a service, a calculation capability of the lead vehicle, storage space, etc. The information such as the above identification of the vehicle team and the resource pool is stored in the storage unit of the lead vehicle in advance, or be assigned and stored in the lead vehicle by the RSU when the lead vehicle is within the coverage of the RSU.

In step S806, the vehicle team is formed.

The vehicle team may be formed through two manners: 1) The lead vehicle detects OBUs of adjacent vehicles, and the lead vehicle sends a request message to the adjacent OBUs to invite the OBUs to join the vehicle team; and the OBU receiving the request sends a response message to accept or deny the request; or 2) OBUs of adjacent vehicles detect the lead vehicle and send request messages to the lead vehicle to request for joining the lead vehicle; and the lead vehicle receiving the requests sends a response message to the OBUs to accept or deny the requests. The above message is sent via multicast or unicast bearer.

If there is a conflict between lead vehicles, for example, both of two adjacent lead vehicles broadcast messages, negotiation may be performed: either to combine to one vehicle team, or continue to broadcast separately. If they negotiate to combine to one vehicle team, the original two lead vehicles negotiate to generate a new lead vehicle. The new lead vehicle may be determined based on a simple principle. For example, one of the original lead vehicles which has a smaller identification number is selected as the new lead vehicle. Alternatively, the new lead vehicle may be generated according to other predefined rule. The predefined rule may include: a rule for generating a lead vehicle defined by the RSU or an operator/a service provider. The rule is stored in the storage unit of the lead vehicle. The negotiation may also include: identification of the combined vehicle team, the wireless resource pool, the period for broadcast of the lead vehicle, the content of the broadcast, members of the vehicle team, etc. If they negotiate to continue to broadcast separately, the two lead vehicles continue to broadcast separately. In this case, in order to avoid conflict, the two lead vehicles may negotiate about the broadcast period and the resource pool, to ensure conflict will not occur for the broadcast period and the resource pool of the two vehicle teams.

If during the travelling process of the vehicle team, there is a member intending to quit. If the lead vehicle quits or the lead vehicle does not hold the post of the lead vehicle, a new lead vehicle determined through negotiation or a candidate lead vehicle of the vehicle team may hold the post of the new lead vehicle. If other member quits, the member notifies the lead vehicle before quitting. If the member fails to notify the lead vehicle, the member notifies other member of the vehicle team, and other member which receives the notification may in turn notify the lead vehicle.

It should be noted that in the embodiment, each of the lead vehicle and the member of the vehicle team includes an OBU, and the OBU (on-board unit) is equivalent to a user equipment (UE).

Hereinafter the alternative embodiments of the present disclosure will be described in detail with reference to specific embodiments.

First Embodiment

Figure 9:
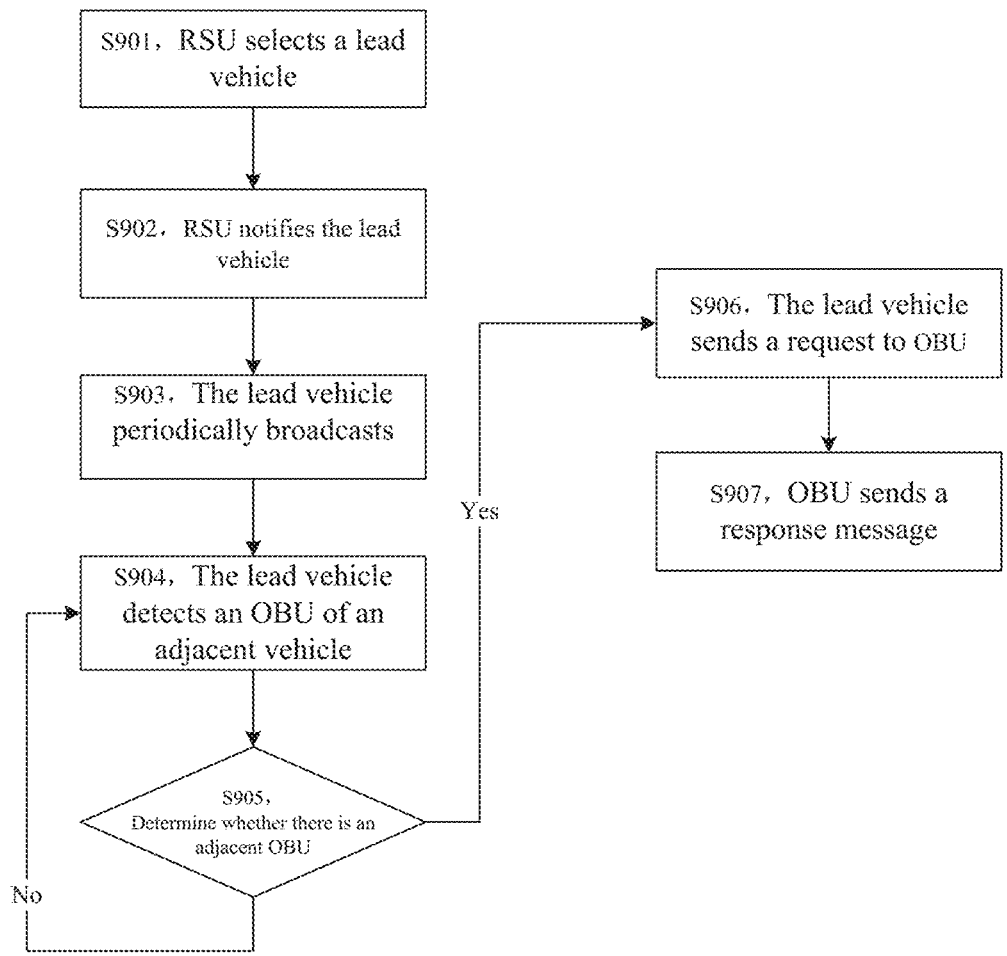
FIG. 9 is a flowchart of a first method according to an alternative embodiment of the present disclosure.

The first embodiment is with respect to a scenario where the OBU of the lead vehicle sends a request within the coverage region of the RSU. FIG. 9 is a flowchart of a first method according to an alternative embodiment of the present disclosure. As shown in FIG. 9, the method includes the following steps.

In step S901, the RSU selects a lead vehicle.

The OBU that satisfies the condition for a lead vehicle generally carries a capability identification. For example, a bit C for lead vehicle capability may be stored on a SIM/USIM card, C=1 means satisfying the condition for a lead vehicle, and C=0 means not satisfying the condition. The OBU that satisfies the condition sends a capability indication data to the RSU, and indicates that the OBU may be a candidate for the lead vehicle. The RSU sends a request to the OBU that satisfies the condition, and inquiries whether the OBU intends to become a lead vehicle. The RSU determines the lead vehicle according to the response message from the OBU that satisfies the condition. Alternatively, the OBU that satisfies the condition sends a request message to the RSU to request for being a lead vehicle. The RSU sends a response message after determination: to approve or deny the request.

In step S902, the RSU notifies the lead vehicle.

The RSU may determine the lead vehicle according to features of an OBU of a vehicle or a condition for a lead vehicle. The features of an OBU may include one or more of: calculation capability, electricity quantity, storage space, location, traveling direction and service ability, etc. The condition for a lead vehicle refers to the requirement for being a lead vehicle, such as one or more of: calculation capability, electricity quantity, storage space, location, and service ability, etc.

The RSU sends a notification massage to the designated lead vehicle. The notification message at least includes: an identification of the vehicle team. Further, the notification message may also include: a wireless resource pool of a vehicle team, and members of a vehicle team.

In step S903, lead vehicle information is periodically broadcast.

The periodical broadcast is sent by the RSU or the lead vehicle. The content of the broadcast at least includes: an identification of the vehicle team and an identification of the lead vehicle. In addition, the content of the broadcast may also include: a wireless resource pool, a location of the vehicle team, a traveling direction, a speed, a service, a calculation capability of the lead vehicle, etc.

In step S904, the lead vehicle detects an OBU of an adjacent vehicle.

The lead vehicle detects an adjacent OBU by D2D Discovery. The discovery resource is assigned by the RSU or selected from the resource pool according to the instruction of the RSU.

In step S905, the lead vehicle determines whether there is an adjacent OBU. If there is an adjacent OBU, the method proceeds to step S906, and if there is no adjacent OBU, the method proceeds to step S904.

The lead vehicle determines whether there is an adjacent OBU according to the discovery result. Since within the coverage of a RSU, generally there will not be conflict between two or more lead vehicles (for example, a lead vehicle discovers another adjacent lead vehicle), once there is a conflict, the lead vehicles in conflict request for arbitration from the RSU or negotiate to determine the final lead vehicle.

In step S906, the lead vehicle sends a request.

The lead vehicle sends a request to the adjacent OBU discovered for inviting the OBU to join the vehicle team of the lead vehicle. The request message also includes any one or more of: an identification of the vehicle team, a travelling direction of the vehicle team, the speed, the service of the vehicle team, the members of the vehicle team, etc. The request is sent via RRC signaling.

In step S907, the OBU sends a response message.

The OBU receives the request message of the lead vehicle. The OBU determines whether to accept the request. The OBU may determine whether to join the vehicle team according to its own status, the lead vehicle information and the rule of the vehicle team. Its own status and the lead vehicle information includes: location, speed, direction, service, storage space, computing capability, etc. The rule of the vehicle team includes the rule setup by the operator/service provider and stored in the storage unit of the OBU, the rule of the broadcast of the lead vehicle, etc. One example of the rule of the vehicle team may be: rights and obligations of a member of the vehicle team.

The OBU determines to join the vehicle team and sends an acceptance response message to the lead vehicle. The response message includes an acceptance identification. The lead vehicle joins the OBU in a list of the members of the vehicle team upon receiving the response message of the OBU. When the OBU determines not to join the vehicle team, the OBU sends a rejection response message to the lead vehicle, and the rejection message includes a rejection identification, and may also include a reason for rejecting to join. The lead vehicle ceases to send a request to the OBU and marks the corresponding OBU (not to join the vehicle team) upon receiving the rejection message from the OBU.

Second Embodiment

Figure 10:
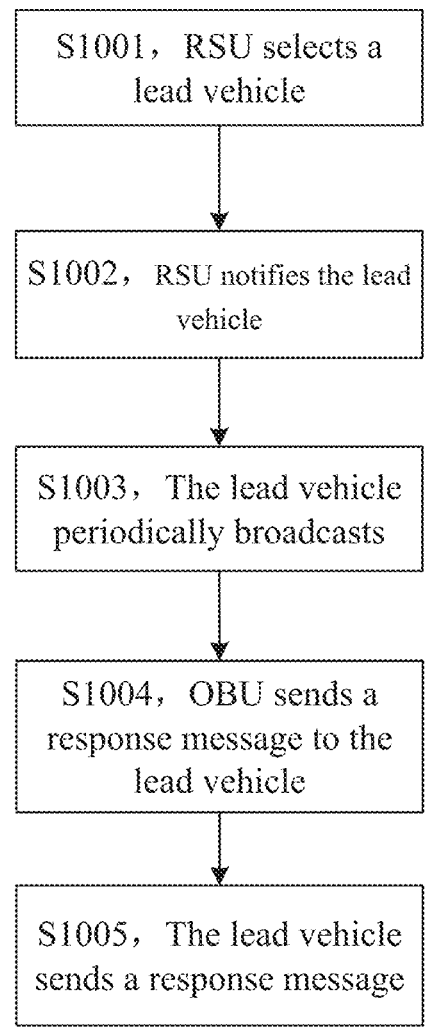
FIG. 10 is a flowchart of a second method according to an alternative embodiment of the present disclosure.

The second embodiment is with respect to a scenario where a vehicle actively joins the vehicle team within the coverage region of the RSU. FIG. 10 is a flowchart of a second method according to an alternative embodiment of the present disclosure. As shown in FIG. 10, the method includes the following steps.

In step S1001, the RSU selects a lead vehicle.

The OBU that satisfies the condition for a lead vehicle generally carries a capability identification. For example, a bit C for lead vehicle capability may be stored on a SIM/USIM card, C=1 means satisfying the condition for a lead vehicle, and C=0 means not satisfying the condition. The OBU that satisfies the condition sends a capability indication data to the RSU, and indicates that the OBU may be a candidate for the lead vehicle. The RSU sends a request to the OBU that satisfies the condition, and inquiries whether the OBU intends to become a lead vehicle. The RSU determines the lead vehicle according to the response message from the OBU that satisfies the condition. Alternatively, the OBU that satisfies the condition sends a request message to the RSU to request for being a lead vehicle. The RSU sends a response message after determination: to approve or deny the request.

In step S1002, The RSU notifies the lead vehicle.

The RSU may determine the lead vehicle according to features of an OBU of a vehicle or a condition for a lead vehicle. The features of an OBU may include one or more of: calculation capability, electricity quantity, storage space, location, traveling direction and service ability, etc. The condition for a lead vehicle refers to the requirement for being a lead vehicle, such as one or more of: calculation capability, electricity quantity, storage space, location, and service ability, etc.

The RSU sends a notification massage to the designated lead vehicle. The notification message at least includes: an identification of the vehicle team. Further, the notification message may also include: a wireless resource pool of a vehicle team, and members of a vehicle team.

In step S1003, lead vehicle information is periodically broadcast.

The periodical broadcast is sent by the RSU or the lead vehicle. The content of the broadcast at least includes: an identification of the vehicle team and an identification of the lead vehicle. In addition, the content of the broadcast may also include: a wireless resource pool, a location of the vehicle team, a traveling direction, a speed, a service, a calculation capability of the lead vehicle, etc.

In step S1004, an adjacent vehicle sends a request message to the lead vehicle.

The vehicle may detect the lead vehicle through the following two manners. 1) The OBU of the adjacent vehicle receives the broadcast message sent by the lead vehicle. 2) The OBU of the adjacent vehicle detects the lead vehicle by D2D Discovery.

After the adjacent vehicle detects the lead vehicle, the adjacent vehicle may determine whether to join the vehicle team according to its own status, the lead vehicle information and the rule of the vehicle team. Its own status and the lead vehicle information includes: location, speed, direction, service, storage space, computing capability, etc. The rule of the vehicle team includes the rule setup by the operator/service provider and stored in the storage unit of the OBU, the rule of the broadcast of the lead vehicle, etc. One example of the rule of the vehicle team may be: rights and obligations of a member of the vehicle team.

The OBU of the adjacent vehicle determines to join the vehicle team and sends a request message to the lead vehicle for requesting to join the vehicle team. The request message includes at least an identification of the OBU. The request message further includes any one or more of: a location of the vehicle, a traveling direction, a speed, a service, a calculation capability, a storage space, whether being a member of other vehicle team. The lead vehicle joins the OBU in a list of the members of the vehicle team upon receiving the request message of the OBU.

When the OBU determines not to join the vehicle team, the OBU does not send a request message to the lead vehicle.

In step S1005, the lead vehicle sends a response message.

The lead vehicle determines whether to accept the request upon receiving the request message from the OBU of the adjacent vehicle. If the lead vehicle determines to accept, the lead vehicle sends an acceptance response message to the adjacent vehicle. The response message includes: an acceptance identification. The response message further includes any one or more of: an identification of the vehicle team, an identification of the lead vehicle, identifications of the members of the vehicle team, a resource pool, etc. If the lead vehicle determines to reject, the lead vehicle sends a rejection response message to the adjacent vehicle. The rejection message includes a rejection identification, and may also include a reason for rejecting.

The above determining is based on status of the vehicle team, the OBU information and the rule of the vehicle team. The status of the vehicle team and the OBU information includes: location, speed, direction, service, storage space, computing capability, etc. The rule of the vehicle team includes the rule setup by the operator/service provider and stored in the storage unit of the OBU, the rule of the broadcast of the lead vehicle, etc. One example of the rule of the vehicle team may be: rights and obligations of a member of the vehicle team.

Third Embodiment

Figure 11:
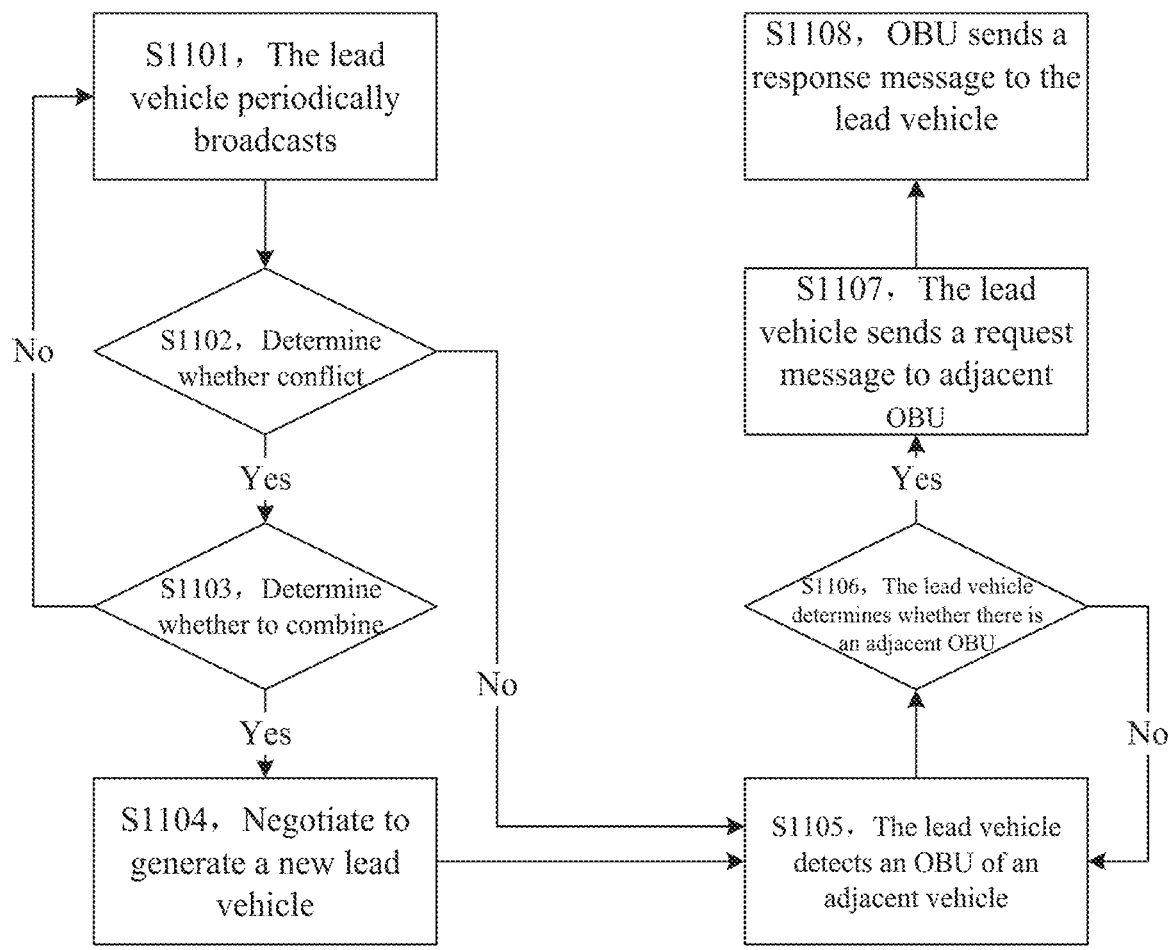
FIG. 11 is a flowchart of a third method according to an alternative embodiment of the present disclosure.

The third embodiment is with respect to a scenario where the lead vehicle sends a request outside the coverage region of the RSU. FIG. 11 is a flowchart of a third method according to an alternative embodiment of the present disclosure. As shown in FIG. 11, the method includes the following steps.

In step S1101, the lead vehicle periodically broadcasts.

The lead vehicle periodically sends a broadcast message outside the coverage region of the RSU. The content includes: an identification of the vehicle team and an identification of the lead vehicle. Further contents may also include any one or more of: location of the lead vehicle, speed, direction, service, calculation capability, storage space, members of the vehicle team, etc. The period is stored in the storage unit of the lead vehicle in advance.

In step S1102, it is determined whether there is a conflict. If there is a conflict, the method proceeds to step S1103, otherwise the method proceeds to step S1105.

The conflict refers to there are two or more lead vehicles are sending broadcast messages in adjacent regions. When a lead vehicle receives a broadcast message from other lead vehicle, it means that a conflict has occurred.

If a conflict occurs, the conflicting lead vehicles negotiate either to combine to one vehicle team, or continue to broadcast separately. If they negotiate to combine to one vehicle team, the original two lead vehicles negotiate to generate a new lead vehicle. The new lead vehicle may be determined based on a simple principle. For example, one of the original lead vehicles which has a smaller identification number is selected as the new lead vehicle. Alternatively, the new lead vehicle may be generated according to other predefined rule. The predefined rule may include: a rule for generating a lead vehicle defined by the RSU or an operator/a service provider. The rule is stored in the storage unit of the lead vehicle. The negotiation may also include: identification of the combined vehicle team, the wireless resource pool, the period for broadcast of the lead vehicle, content of the broadcast, members of the vehicle team, etc. If they negotiate to continue to broadcast separately, the two lead vehicles continue to broadcast separately. In this case, in order to avoid conflict, the two lead vehicles may negotiate about the broadcast periods and the resource pools, to ensure conflict will not occur for the broadcast periods and the resource pools of the two vehicle teams.

In step S1103, it is determined whether to combine. If it is determined to combine, the method proceeds to step S1104, otherwise the method proceeds to step S1101.

Two or more vehicle teams are outside the coverage region of the RSU, the two or more lead vehicles receive the broadcast message from each other. It may be determined whether to combine according to any one or more of the following rules: the travel directions of the two or more vehicle teams, vehicle team speeds, the distance between the vehicle teams, indication data of the lead vehicles, strategies of the operator/service provider, and other conditions.

If the condition for combining is satisfied, and the two lead vehicles agree to combine, it is determined to combine.

If it is determined not to combine through negotiation, the conflicting lead vehicles continue to broadcast separately. In order to avoid further conflict, the two lead vehicles may negotiate about the broadcast periods and the resource pools, to ensure conflict will not occur for the broadcast periods and the resource pools of the two vehicle teams.

In step S1104, a new lead vehicle is generated through negotiation.

The lead vehicles to be combined negotiate, and select a new lead vehicle according to a certain rule. The new lead vehicle is generally one of the lead vehicles to be combined, or the lead vehicles to be combined suggest selecting one, for example of the candidate lead vehicles in the original vehicle team.

1) If the new lead vehicle is one of the original lead vehicles, A, the original lead vehicle B which is not selected will notify the identifications of the members of the vehicle team of the present vehicle team g2 to A, and B informs the original vehicle team g2 the new lead vehicle A and the new identification g3 of the new vehicle team.

2) If the new vehicle team is a newly selected C, the original lead vehicles, A and B will notify the identifications of the members of their vehicle teams to C.

In step S1105, the lead vehicle detects an OBU of an adjacent vehicle.

In step S1106, the lead vehicle determines whether there is an adjacent OBU. If there is an adjacent OBU, the method proceeds to step S1107, otherwise the method proceeds to step S1105.

In step S1107, the lead vehicle sends a request message to the adjacent OBU.

In step S1108, the OBU sends a response message to the lead vehicle.

Fourth Embodiment

Figure 12:
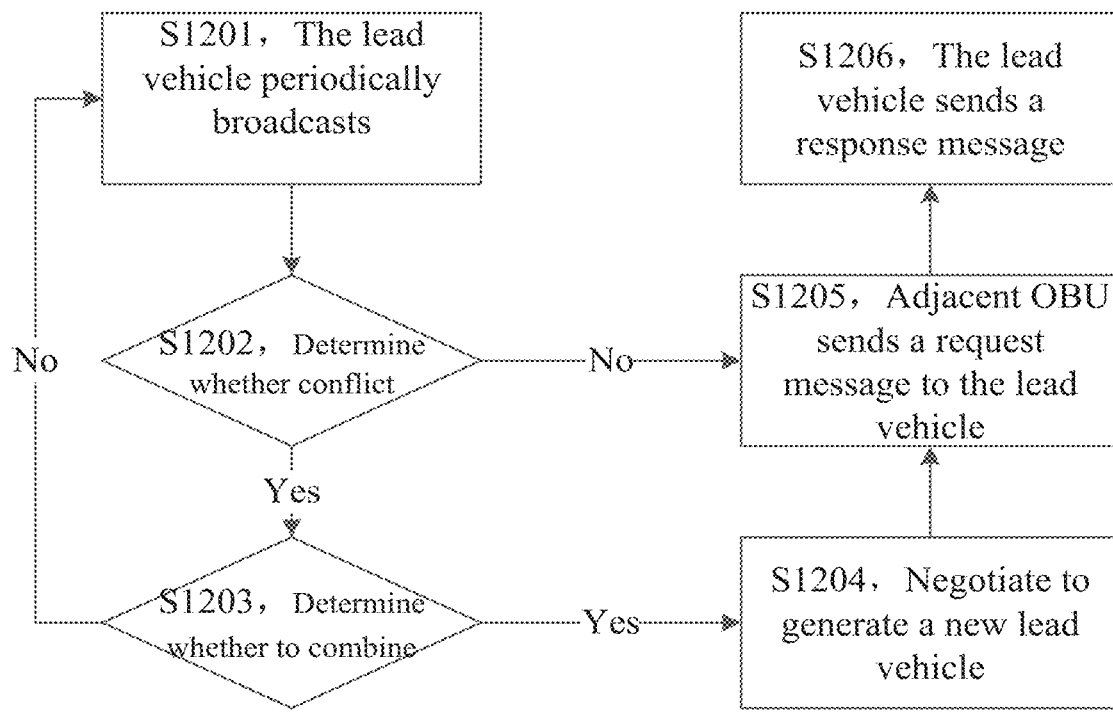
FIG. 12 is a flowchart of a fourth method according to an alternative embodiment of the present disclosure.

The fourth embodiment is with respect to a scenario where a vehicle actively joins the vehicle team outside the coverage region of the RSU. FIG. 12 is a flowchart of a fourth method according to an alternative embodiment of the present disclosure. As shown in FIG. 12, the method includes the following steps.

In step S1201, the lead vehicle periodically broadcasts.

In step S1202, it is determined whether there is a conflict. If there is a conflict, the method proceeds to step S1203, otherwise the method proceeds to step S1205.

In step S1203, it is determined whether to combine through negotiation. If it is determined to combine, the method proceeds to step S1204, otherwise the method proceeds to step S1201.

In step S1204, a new lead vehicle is generated through negotiation.

If the lead vehicle does not change, the lead vehicle notifies the members of the vehicle team. If the lead vehicle has changed, the original lead vehicle notifies the new lead vehicle and the members of the vehicle team. The notification includes: an identification of the vehicle team, identifications of the members of the vehicle team, an identification of the lead vehicle. The notification may also include: the resource pool and the period for broadcast of the lead vehicle. The notification may be implemented by V2V.

In step S1205, the adjacent OBU sends a request message to the lead vehicle.

In step S1206, the lead vehicle sends a response message.

The lead vehicle determines whether to accept the request upon receiving the request message from the OBU of the adjacent vehicle. If the lead vehicle determines to accept, the lead vehicle sends an acceptance response message to the adjacent vehicle. The response message includes: an acceptance identification. The response message further includes any one or more of: an identification of the vehicle team, an identification of the lead vehicle, identifications of the members of the vehicle team, a resource pool, etc. If the lead vehicle determines to reject, the lead vehicle sends a rejection response message to the adjacent vehicle. The rejection message includes a rejection identification, and may also include a reason for rejecting.

Figure 13:
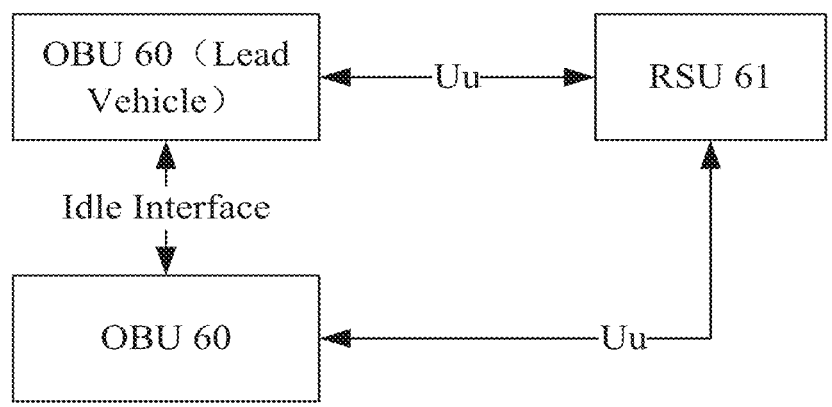
FIG. 13 is a block diagram illustrating a system for grouping a vehicle team according to an embodiment of the present disclosure.

FIG. 13 is a block diagram illustrating a system for grouping a vehicle team according to an embodiment of the present disclosure. As shown in FIG. 13, the system includes: an OBU 60 and a RSU 61.

The RSU 61 is configured to select a lead vehicle within the coverage region and assign wireless resource and an identification of a vehicle team, and is also configured to notify the lead vehicle.

The OBU 60 is configured to receive a notification message broadcast by the RSU 61, and determine whether to be a lead vehicle outside the coverage region, send a request/response message to the lead vehicle, and receive a request/response message sent from the lead vehicle.

Figure 14:
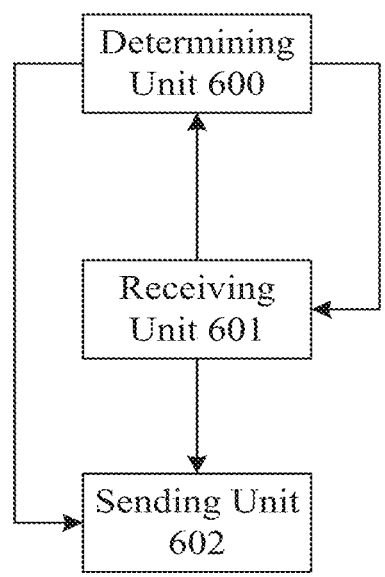
FIG. 14 is a block diagram illustrating an OBU for grouping a vehicle team according to an embodiment of the present disclosure.

FIG. 14 is a block diagram illustrating an OBU for grouping a vehicle team according to an embodiment of the present disclosure. As shown in FIG. 14, the OBU includes: a determining unit 600, a receiving unit 601 and a sending unit 602.

The determining unit 600 is configured to whether to join a vehicle team.

The receiving unit 601 is configured to receive an indication data from the RSU, and is also configured to receive a request/response message from the lead vehicle.

The sending unit 602 is configured to send a request/response message to the RSU/lead vehicle.

It should be noted that, each of the above modules may be implemented by software or hardware. For implementation in hardware, it may be implemented by, but not limited to: the above modules are all disposed in the same processor; or the above modules are respectively in multiple processors.

An embodiment of the present disclosure further provides a computer readable storage medium storing computer executable instructions which, when executed by a processor, implement the above method.

In the embodiment, the above computer readable storage medium may be configured to store instructions to implement the following steps:

In step S1: a designated vehicle that satisfies a preset condition receives a first indication data from the RSU within a coverage region of a RSU. The first indication data is for indicating that the designated vehicle has management authority for managing a vehicle group to which the designated vehicle belongs.

In step S2, the designated vehicle periodically broadcasts a first message to vehicles within the coverage of the RSU and/or outside the coverage of the RSU, the first message being for indicating grouping the vehicle.

In step S3, the designated vehicle receives a second message in response to the first message, the second message being for indicating joining the vehicle group.

In step S4, the designated vehicle groups the vehicle which sends the second message to the vehicle group.

In the embodiment, the storage medium may include, but not limited to, a U disk, a read-only memory (ROM), a random access memory (RAM), a removable hard disk, a magnetic disk, an optical disk, or a variety of media that may store program codes.

Alternatively, for a specific example in the embodiment, reference may be made to the examples described in the foregoing embodiments and alternative embodiments, and details are not repeated herein in the embodiment.

Apparently, those skilled in the art should understand that the modules or steps in the above embodiments of the present disclosure may be implemented by a general-purposed computing device, which may be centralized on a single computing device or distributed on a network composed by multiple computing devices. Alternatively, the modules or steps in the above embodiments of the present disclosure may be implemented with program codes executable by the computing device, so that they may be stored in the storage device for execution by the computing device and in some cases may be executed in an order different from what is shown or described herein. Alternatively, each module or each step in the above embodiments of the present disclosure may be formed as individual integrated circuit module or a plurality of modules or steps may be formed into a single integrated circuit module. In this way, the embodiments of the present disclosure are not limited to any specific combination of hardware and software.

The foregoing descriptions are merely preferred embodiments of the present disclosure, and are not intended to limit the embodiments of the present disclosure. For those skilled in the art, the embodiments of the present disclosure may have various changes and modifications. Any modification, equivalent replacement, improvement, etc. within the spirit and principle of the embodiments of the present disclosure should be included in the protection scope of the embodiments of the present disclosure.

INDUSTRIAL UTILITY

The embodiments of the present disclosure provide a method and a device for grouping vehicles in Vehicle to Everything. The RSU sends a first indication data to a designated vehicle that satisfies a preset condition in the coverage of the RSU. The first indication data is for indicating that the designated vehicle has management authority for managing a vehicle group to which the designated vehicle belongs. The designated vehicle periodically broadcasts a first message to vehicles within the coverage of the RSU and/or outside the coverage of the RSU, the first message being for indicating grouping the vehicle. The designated vehicle groups the vehicle which responds to the first message and intends to join the vehicle group into one group. In this way, the vehicles in Vehicle to Everything may be managed in groups. It may solve the problem that the device at the network side fails to allocate and release resources for the vehicles in Vehicle to Everything in time.

What is claimed is:

1. A method for grouping vehicles in Vehicle to Everything, comprising:
receiving, by a designated vehicle that satisfies a preset condition within a coverage region of a Road Side Unit (RSU), a first indication data from the RSU, the first indication data being for indicating that the designated vehicle becomes a vehicle having management authority for managing a vehicle group to which the designated vehicle belongs, or negotiating, by designated vehicles that satisfy the preset condition outside the coverage region of the RSU, to select a final designated vehicle from the designated vehicles that satisfy the preset condition outside the coverage region of the RSU, the vehicle group consisting of vehicles;
periodically broadcasting, by the designated vehicle, a first message to vehicles within the coverage of the RSU and/or outside the coverage of the RSU, the first message being for indicating grouping the vehicle;
receiving, by the designated vehicle, a second message in response to the first message, the second message being for indicating joining the vehicle group; and
grouping, by the designated vehicle, a vehicle which sends the second message to the vehicle group;
wherein receiving, by the designated vehicle, the second message in response to the first message comprises:
sending, by the designated vehicle, a request message to the vehicle responding to the first message, the request message being for requesting the vehicle to join the vehicle group; and
receiving, by the designated vehicle, the second message in response to the request message.

2. The method according to claim 1, wherein after the step of receiving, by a designated vehicle that satisfies a preset condition within a coverage region of a Road Side Unit RSU, a first indication data from the RSU, the method further comprises:
when there are multiple vehicles having management authority, receiving, by the designated vehicle, a second indication data sent from the RSU, the second indication data being for indicating that the designated vehicle is the final vehicle having the management authority; or, taking the designated vehicle as the final vehicle having the management authority according to a preset rule.

3. The method according to claim 2, wherein the preset condition comprises at least one of: a calculation capability, an electricity quantity, a storage space, a location, a traveling direction and a service ability.

4. The method according to claim 1, wherein after the step of grouping, by the designated vehicle, the vehicle which sends the second message to the vehicle group, the method further comprises:
when a vehicle in the vehicle group intends to quit the vehicle group, receiving, by the designated vehicle, a notification message for informing quitting the vehicle group; and
releasing, by the designated vehicle, the management authority to the vehicle which intends to quit the vehicle group.

5. The method according to claim 1, wherein the preset condition comprises at least one of: a calculation capability, an electricity quantity, a storage space, a location, a traveling direction and a service ability.

6. The method according to claim 1, wherein the first message carries at least one of: a wireless resource pool, a location of a vehicle group, a traveling direction, a speed, and a Vehicle to Everything service.

7. The method according to claim 1, wherein the designated vehicles that satisfy the preset condition negotiate based on one or more of the following conditions: vehicle identification numbers, vehicle calculation capabilities, vehicle storage spaces, vehicle locations, and a predefined rule.

8. The method according to claim 1, wherein the RSU is a base station eNB or a stationary user equipment UE or a dedicated RSU, the vehicle comprises an on-board unit OBU, and the OBU is equivalent to an UE.

9. A device for grouping vehicles in Vehicle to Everything, disposed at a side of a designated vehicle that satisfies a preset condition in Vehicle to Everything, and the device comprising:
a processor; and
a memory storing instructions executable by the processor,
wherein the processor is configured to perform:
receiving, within a coverage region of a Road Side Unit (RSU), a first indication data from the RSU, the first indication data being for indicating that the designated vehicle becomes a vehicle having management authority for managing a vehicle group to which the designated vehicle belongs, or negotiating, outside the coverage region of the RSU, to select a final designated vehicle from designated vehicles that satisfy the preset condition outside the coverage region of the RSU, the vehicle group consisting of vehicles;
periodically broadcasting a first message to vehicles within the coverage of the RSU and/or outside the coverage of the RSU, the first message being for indicating grouping the vehicle;
receiving a second message in response to the first message, the second message being for indicating joining the vehicle group; and grouping a vehicle which sends the second message to the vehicle group;
wherein the processor is further configured to perform:
sending, by the designated vehicle, a request message to the vehicle responding to the first message, the request message being for requesting the vehicle to join the vehicle group; and
receiving, by the designated vehicle, the second message in response to the request message.

10. The device according to claim 9, wherein receiving a second message in response to the first message comprises:
sending a request message to the vehicle responding to the first message, the request message being for requesting the vehicle to join the vehicle group; and
receiving the second message in response to the request message; or receiving the second message from the vehicle that receives the first message.

11. The device according to claim 10, wherein the preset condition comprises at least one of: a calculation capability, an electricity quantity, a storage space, a location, a traveling direction and a service ability.

12. The device according to claim 9, wherein after the step of receiving, within a coverage region of a Road Side Unit RSU, a first indication data from the RSU, the processor is further configured to perform:
when there are multiple vehicles having management authority, receiving a second indication data sent from the RSU, the second indication data being for indicating that the designated vehicle is the final vehicle having the management authority; or, taking the designated vehicle as the final vehicle having the management authority according to a preset rule.

13. The device according to claim 9, wherein after the step of grouping the vehicle which sends the second message to the vehicle group, the processor is further configured to perform:
when a vehicle in the vehicle group intends to quit the vehicle group, receiving a notification message for informing quitting the vehicle group; and
releasing the management authority to the vehicle which intends to quit the vehicle group.

14. The device according to claim 9, wherein the preset condition comprises at least one of: a calculation capability, an electricity quantity, a storage space, a location, a traveling direction and a service ability.

15. The device according to claim 9, wherein the first message carries at least one of: a wireless resource pool, a location of a vehicle group, a traveling direction, a speed, and a Vehicle to Everything service.

16. The device according to claim 9, wherein the designated vehicles that satisfy the preset condition negotiate based on one or more of the following conditions: vehicle identification numbers, vehicle calculation capabilities, vehicle storage spaces, vehicle locations, and a predefined rule.

17. A non-transitory computer-readable storage medium storing computer-executable instructions that, when being executed by a processor, implement the method of claim 1.

* * * * *